Oct. 24, 1961 L. L. RICHART 3,005,451
PORTABLE BARBECUE GRILL
Filed Jan. 26, 1959 2 Sheets-Sheet 1

INVENTOR.
LESTER L. RICHART.
BY *Max E. Shirk*
ATTORNEY.

Oct. 24, 1961   L. L. RICHART   3,005,451
PORTABLE BARBECUE GRILL
Filed Jan. 26, 1959   2 Sheets-Sheet 2

INVENTOR.
LESTER L. RICHART.
BY Max E. Shirk
ATTORNEY.

United States Patent Office 3,005,451
Patented Oct. 24, 1961

3,005,451
PORTABLE BARBECUE GRILL
Lester L. Richart, 1433 E. Broadway, Tucson, Ariz.
Filed Jan. 26, 1959, Ser. No. 789,116
1 Claim. (Cl. 126—25)

This invention relates generally to a portable barbecue grill and more particularly to a collapsible grill which is adjustable for both home use where a large grill is required and for use by campers where a much smaller grill is sufficient.

It is an object of my invention to provide a collapsible, adjustable barbecue grill which when collapsed or dismantled, occupies a minimum of space and presents a neat package having no cumbersome protuberances.

Another object of the invention is to provide a barbecue grill which may be readily adjusted to offer cooking units of various sizes.

A further object of the invention is to provide a barbecue grill having a telescoping fire pan.

A still further object of the invention is to provide a simple and inexpensive barbecue grill and yet one which will be exceedingly sturdy and effective for the purposes for which designed.

These objects I accomplish by means of such structure and relative arrangement of parts as will fully appear in the following specification and claim.

In the drawings similar characters of reference indicate corresponding parts in the several views.

Figure 1:
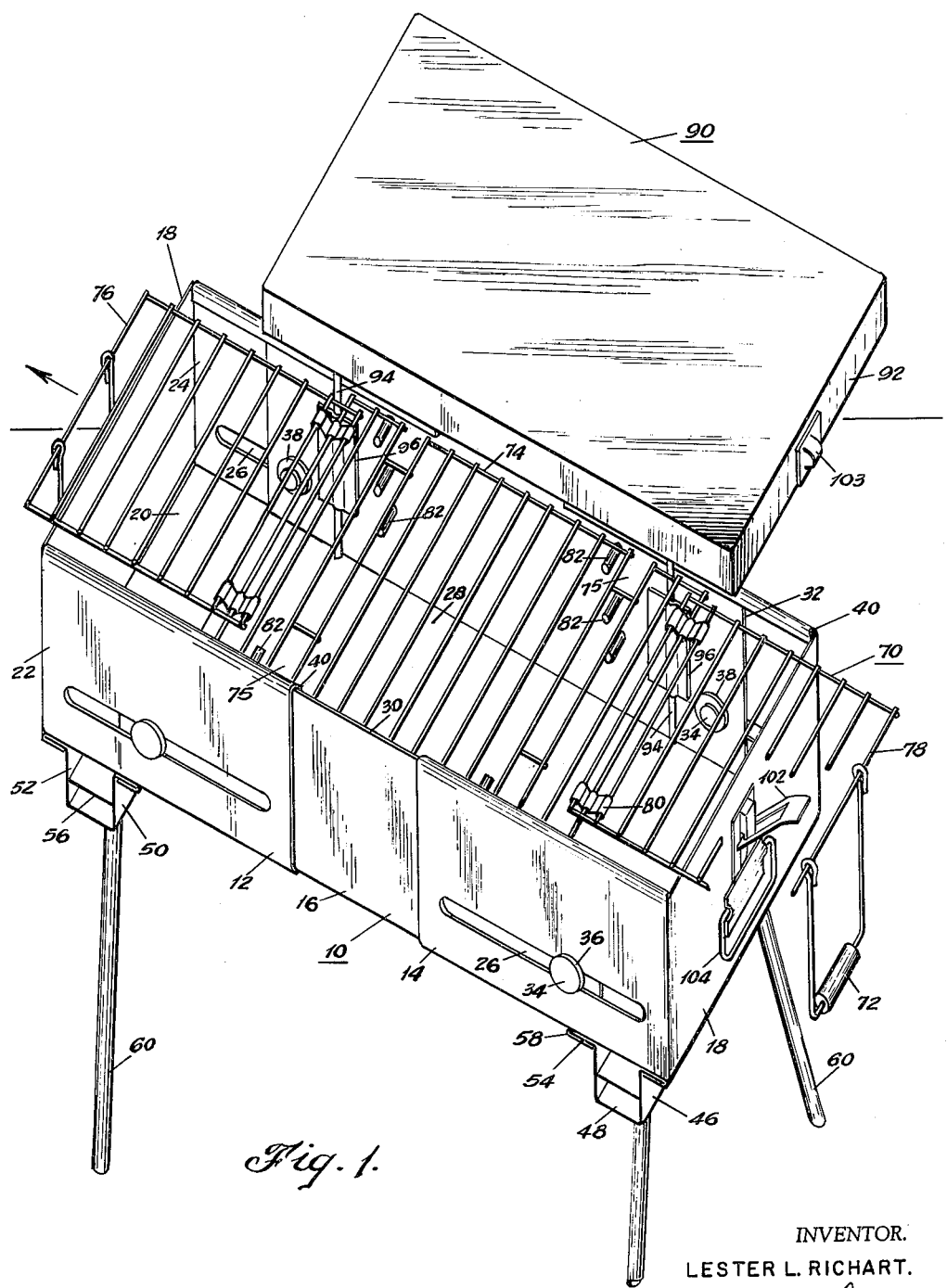
FIGURE 1 is a perspective view of the barbecue grill assembled for use.

Referring now more particularly to the characters of reference on the drawings, my collapsible barbecue grill is constructed from relatively light metal, or other suitable material and comprises the following parts:

A rectangular box or fire pan 10 includes two end pieces or telescoping sections 12 and 14, respectively, adapted to slidingly engage, and be joined together by, a center section 16. The end pieces 12 and 14 each have an endwall 18, a bottom wall 20 and sidewalls 22 and 24. The sidewalls 22 and 24 each have a horizontal slot 26, as shown.

The center section 16 has a bottom wall 28 and sidewalls 30 and 32 which may be tapped to receive threaded bolts, not shown, or may be performed to receive rivets 34 which have enlarged heads 36 and may be held in place by washers 38. The rivets 34 are inserted through the slots 26 and into perforations, not shown, in the walls 30 and 32. Then the washers 38 may be held in place by peening the end of the rivets 34. The rivets 34 hold the end pieces 12 and 14 and the center section 16 of the fire pan 10 together. For added rigidity, the sidewalls 22 and 24 of the end pieces 12 and 14 may each have a lip 40 which is bent over the top edges of the respective sidewall 30 or 32 of the center section 16 to form a channel in which said top edges may slide; or, if desired, the center section 16 may have a lip which forms a channel in which the top edges of sidewalls 30 and 32 may slide.

The slots 26 and the center section 16 are so proportioned that the fire pan 10 may be telescoped together until it is the same length as the center section 16; or fire pans 10 having many other widths may be obtained by moving either one or both end pieces 12 and 14 out toward the ends of the center section 16.

Figure 4:
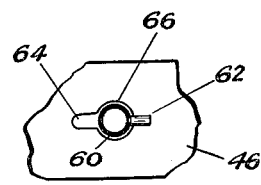
FIGURE 4 is a fragmentary plan view of the detail shown in FIGURE 3 and is taken along line 4—4 of FIGURE 3.

The fire pan 10 may be supported on the ground or on a picnic table by means of supports or base members 46 which are channel shaped in section and include a bottom wall 48, sidewalls 50 and 52 having outwardly extending flanges 54, and a stiffener plate 56. The base members 46 are removably mounted on the bottom of the fire pan 10 by means of channels 58 into which the flanges 54 may be slid. The fire pan 10 may also be supported by tubular legs 60. Each leg 60 has a protuberance or pin 62 (FIGURE 4) which is designed to pass through a cut-out portion 64 in an aperture 66 in the bottom wall 48. When the leg 60 is rotated so that the pin 62 moves past the cut-out portion 64, the pin 62 will bind against the bottom wall 48 and hold the leg 60 in place. The leg 60 also passes through an aperture 68 in the plate 56. The aperture 68 is offset from the aperture 66 so that the leg 60 will be inclined from the vertical, as shown.

A sectional grill or cooking rack 70 has handles 72 and includes a center section 74 having openings 75 and two end sections 76 and 78. The sections are hinged together by means of hinges 80 which are arranged so that the three sections of the grill 70 may be extended as shown in FIGURE 1 to present a maximum cooking surface; or so that one end section 76 may drape down over the endwall 18 of end piece 12 when it is telescoped inwardly on the center section 16 to reduce the cooking surface by one third; or so that both end sections 76 and 78 may be draped over the respective endwalls 18 when both end pieces 12 and 14 are telescoped inwardly on the center section 16 to reduce the cooking surface by two-thirds. The grill is supported within the fire pan 10 on a grill support or pins 82 which are rigidly affixed to the sidewalls 30 and 32 of the center section 16 of the fire pan 10. A plurality of vertically aligned pins 82 may be used, as shown, to permit adjusting the height of the cooking rack 70 above the bottom of the fire pan 10. When it is desired to change the height of the rack 70 it is moved longitudinally in the direction of the arrow in FIGURE 1 until the rows of pins 82 are lined-up with the openings 75 in the rack 70. The rack 70 may then be lowered or raised, as the case may be, until a desired elevation is reached. The rack 70 is then moved longitudinally in a direction opposite the arrow until the openings 75 have moved past the pins 82.

A lid or tray 90, having a depending peripheral lip 92 and being substantially the same length as the center section 16 of the fire pan 10, has two brackets 94 removably mounted thereon by any suitable means, not shown. The brackets 94 support the tray 90 in a position adjacent the upper edge of the sidewall 32 of the center section 16 by slidably engaging guides 96 which are rigidly affixed, as by welding, to the sidewall 32 of the center section 16. Of course it is obvious that the grill support 82 and the guides 96 may be fabricated from a single piece of material which may then be welded to the sidewall 32. As will be hereinafter explained in connection with FIGURE 2, the lid or tray 90 may also be used as a cover for the barbecue grill when it has been dismantled and assembled into a package.

Figure 5:
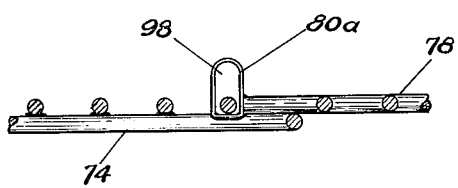
FIGURE 5 is a fragmentary cross-sectional view of a second embodiment of a detail shown in FIGURE 1 in one of its positions.
Figure 6:
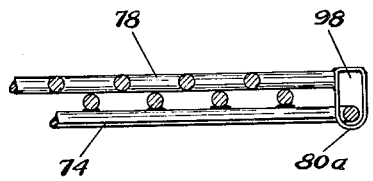
FIGURE 6 is a fragmentary cross-sectional view of the embodiment of FIGURE 4 in another of its positions.

FIGURES 5 and 6 show a second embodiment of a hinge 80a which may be used in place of the hinges 80 for the cooking rack 70. Hinges 80a are affixed to the end sections 76 and 78 of the rack and have elongated openings 102 which surround the ends of the center section 74 of the rack 70. The elongated openings 98 permit the cooking rack 70 to remain flat in either its extended position (FIGURE 5) or its folded position (FIGURE 6).

Figure 2:
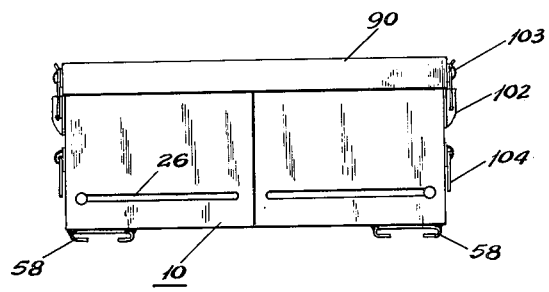
FIGURE 2 is a front elevational view of the package into which the dismantled barbecue grill may be assembled.
Figure 3:
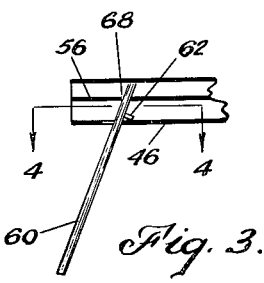
FIGURE 3 is a fragmentary cross-sectional view showing a detail of construction of the grill of FIGURE 1.

The barbecue assembly may be disassembled and packed into the package shown in FIGURE 2. Such a package is obtained by (1) folding the end sections 76 and 78 and handles 72 of rack 70 over onto its center section 74 and placing the rack 70 on the bottom of the center section 16 of the fire pan 10, (2) telescoping the fire pan 10 together, (3) removing the legs 60 and base members 46 and putting them inside the fire pan 10, (4) removing the lid or tray 90 from the brackets 94, (5) removing the brackets 94 and placing them inside the fire pan 10, and (6) placing the lid 90 over the fire pan 10 in such a manner that the peripheral lip 92 surrounds the upper edges of the fire pan 10, thereby preventing the fire pan 10 from becoming extended. The lid 92 may be secured to the fire pan 10 by any well known latch means such as the snaps 102 and the protuberances 103. A handle 104 may be provided for ease in carrying the package shown in FIGURE 2.

It will be obvious that I have invented a new and useful barbecue grill which is inexpensive and sturdy, is easily adjusted to produce various sizes of cooking units and may be readily dismantled and assembled into a package.

It will also be obvious that various modifications of the embodiment of the invention shown and described for purposes of illustration can be made without departing from the spirit and scope of the invention. It should, therefore, be understood that I do not wish to limit myself to the exact structural details of the device shown herein for purposes of illustration, but not of limitation.

I claim:

A portable barbecue grill comprising an open-top firepan having end sections and a center section telescopically arranged, each section including sidewalls and a bottom wall, said end section closing on said center sections in such a manner that the size of said pan can be varied from a pan having an open-top corresponding in an area to the area of the bottom wall of said center section to a pan having an open-top corresponding in area to the collective area of the bottom wall of all sections, a channel rigidly affixed to said bottom wall adjacent each end thereof, a base member slidably mounted on each channel, a cooking rack having sections corresponding in size and number to the size and number of said sections, and support means supporting said rack in cooking position in said pan regardless of the degree of closing of said end sections on said center section, said support means including vertically aligned pins affixed to the side walls of said center section, and hinge means connecting said rack sections together in such a manner that said rack sections present a flat cooking surface corresponding in area to the area of the bottom of said center section when said rack sections are folded over on top of each other.

References Cited in the file of this patent

UNITED STATES PATENTS

| | | |
|---|---|---|
| 479,652 | Marcee | July 26, 1892 |
| 605,999 | Charroin | June 21, 1898 |
| 1,487,737 | Goldberg et al. | Mar. 25, 1924 |
| 1,830,230 | Gwyer | Nov. 3, 1931 |
| 2,055,564 | Tinnerman | Sept. 29, 1936 |
| 2,332,117 | Shepherd | Oct. 19, 1943 |
| 2,376,640 | Wall et al. | May 22, 1945 |
| 2,519,263 | Lucas | Aug. 15, 1950 |
| 2,552,861 | Overman | May 15, 1951 |
| 2,792,773 | Barker | May 21, 1957 |
| 2,838,991 | Kleinmann et al. | June 17, 1958 |
| 2,891,465 | Rogge | June 23, 1959 |
| 2,893,373 | Rundle | July 7, 1959 |
| 2,922,414 | Brender | Jan. 26, 1960 |

FOREIGN PATENTS

| | | |
|---|---|---|
| 472,274 | France | July 31, 1914 |
| 14,198 | Great Britain | 1909 |